Dec. 27, 1960

L. H. SANDSTROM 2,966,611

RUGGEDIZED KLYSTRON TUNER

Filed July 21, 1959

3 Sheets-Sheet 1

INVENTOR
LARS H. SANDSTROM
BY
Henry Huff
ATTORNEY

INVENTOR
LARS H. SANDSTROM
BY Henry Huff
ATTORNEY

Dec. 27, 1960

L. H. SANDSTROM 2,966,611

RUGGEDIZED KLYSTRON TUNER

Filed July 21, 1959

3 Sheets-Sheet 3

INVENTOR
LARS H. SANDSTROM
BY
[signature]
ATTORNEY

United States Patent Office 2,966,611

Patented Dec. 27, 1960

2,966,611

RUGGEDIZED KLYSTRON TUNER

Lars H. Sandstrom, Gainesville, Fla., assignor to Sperry Rand Corporation, Great Neck, N.Y., a corporation of Delaware Filed July 21, 1959, Ser. No. 828,605

9 Claims. (Cl. 315—5.22)

This invention pertains to electron discharge devices and in particular it concerns a novel tuning system for use with cavity type microwave tubes.

Microwave oscillators, especially those more commonly known as reflex klystrons are often tuned by adjustment of the distance between adjacent grids of a resonant cavity. This causes the cavity to resonate at different frequencies. The amount of grid movement necessary to obtain a specific frequency change, however, depends upon the frequency at which the change is made.

As klystron tubes are used at higher and higher frequencies, the cavities used with them become correspondingly smaller. The consequent frequency sensitivity to movement of the resonator grids in turn increases by an even greater proportion. Thus it can be seen that for operation in the higher frequency ranges a very accurate tuning system is necessary. Obviously, such a system must also be very rugged and stable.

Because the amount of grid movement necessary to obtain a specific frequency variation is also dependent upon that portion of the operating range to which the cavity happens to be tuned, it is desirable to provide a non-linear mechanism so as to permit accurate and even tuning over the entire range. This is especially important where the tube is to be used in conjunction with a servo system.

It is an object of this invention, therefore, to produce a klystron tuner mechanism wherein equal frequency changes are effected by equal tuning adjustments over the entire range of operation.

It is another object of this invention to provide a klystron tuning means which is rugged and accurate especially at higher frequencies.

It is another object of this invention to produce a tunable klystron which may be conveniently calibrated during operation.

It is a further object of this invention to provide a tunable klystron wherein the required tuning torque is adjustable.

It is a still further object of this invention to provide a tunable klystron which is easily adaptable to servo operation.

In brief, the present invention accomplishes its result in the following manner. An actuating system is provided having a variable mechanical advantage. The output of this actuating system is connected to a column or link which is also attached to the tunable resonant cavity of the tube. By moving the input arm of the actuator the link is made to open or close the grid spacing in the cavity in such a manner that the non-linearity of the system compensates for the non-linearity of cavity output. A resilient means such as a spring is attached to the link. In order to prevent mechanical backlash and to insure against shock and vibration, the spring constant is kept quite high, and in some embodiments takes the form of a portion of the tube housing. Furthermore, the spring is directly attached to the link. This arrangement insures maximum exploitation of the spring forces to maintain stability while also making use of maximum mechanical advantage to permit ease of tuning. Referring now to the figures:

Figure 1:
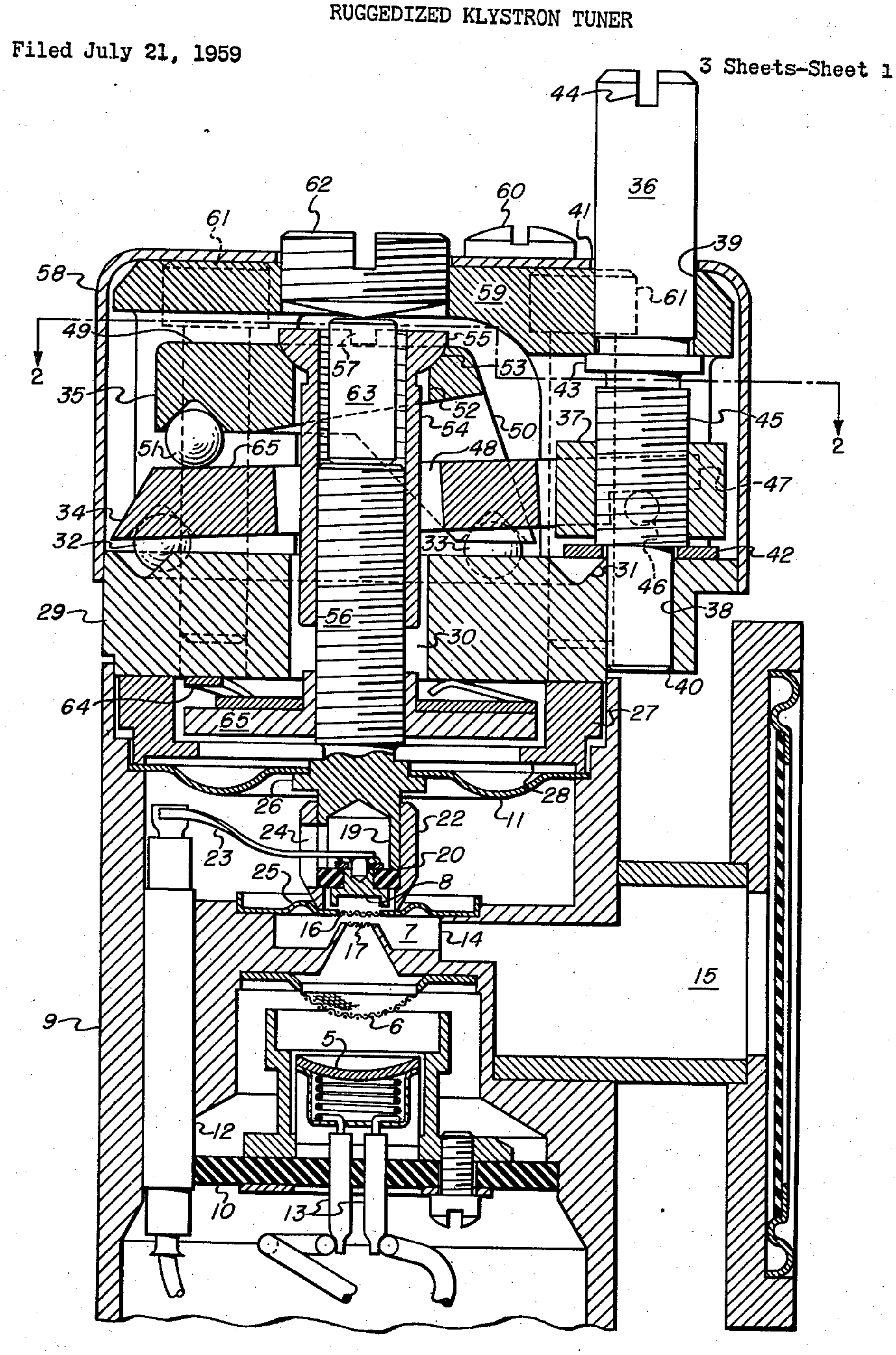
Fig. 1 is a view of a cross section of a preferred embodiment of the invention.

Referring first to Fig. 1, the lower portion of the klystron is seen to include a heated cathode 5 for initiation of an electron beam, a focusing electrode 6 for forming and directing the beam, a hollow resonant cavity 7 for converting beam energy into microwave oscillations, and a repeller electrode 8 for redirecting the beam toward the cavity. A lower tubular housing 9 and a bottom plate 10 serve to support and enclose these items. A flexible diaphragm 11 completes the enclosure so as to maintain a vacuum therein.

Input voltages to the electrodes and heater are fed in through sealed passages 12 and 13. Output oscillations are coupled through a window 14 in the cavity to a waveguide output 15.

The cavity 7 contains two closely spaced grids 16 and 17 through which the electron beam passes. The frequency at which the cavity will resonate is determined by the distance between these two grids. The upper cavity wall 25, which contains the upper grid 16, is flexible so as to permit variation in grid spacing. This variation is accomplished through movement of the repeller electrode housing assembly. This assembly consists of a spacer member 19, an insulating support 20, a repeller electrode structure 8 and a connecting cap 22. The repeller electrode voltage lead 23 is brought out through a slot 24 in the connecting cap and spacer member. The connecting cap 22 is silver soldered or welded to the upper cavity wall 25. The spacer member 19 contains a flange 26 to which is soldered or welded the aforementioned flexible diaphragm 11. This insures the maintenance of a vacuum enclosure and permits axial motion of the spacer member while preventing its rotation.

Immediately above the flexible diaphragm 11, but within the lower tubular housing 9, is a ring structure 27. This serves as a support for the upper tube assembly, and contains an inner flange 28 for limiting downward motion of the link assembly.

A plate 29 serves as a base for the upper tube housing assembly and the actuator assembly. A hole 30, in the plate permits passage and operation of link assembly. Screws around the periphery of the plate serve to fasten it rigidly to the ring structure 27. An annular V-groove 31 is cut in the upper surface of the plate near its outer diameter. This groove serves to locate and support pivot balls 32 and 33 which are attached to the lever arms 34 and 35 of the actuator assembly.

Figure 2:
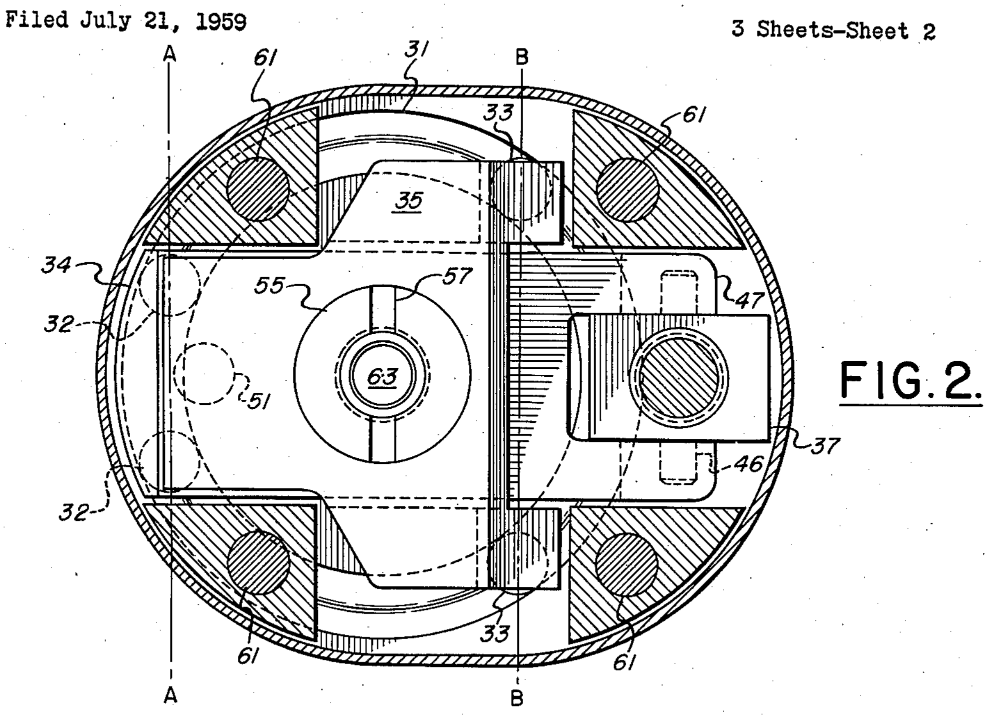
Fig. 2 is a section view of the device taken at 2—2.

The actuator assembly includes an input lever arm 34, an output lever arm 35, a tuning screw 36 and an actuating nut 37. (Reference should be made to both Figs. 1 and 2 in order to more easily visualize this structure.)

The tuning screw 36 contains bearing portions 38 and 39 which fit respectively into holes 40 and 41 in the upper housing assembly. Two flanges 42 and 43 on the screw restrict it from axial motion. A slotted knob 44 at the input end of the screw is provided so as to enable connection to a servo system. However, any manual or automatic control means may be conveniently applied by proper modification of the knob. The actuating nut 37 is engaged on a threaded portion 45 of the tuning screw. Pins 46 extend out on either side of the nut and contact extended arms 47 of the input lever 34, moving this lever up as the tuning screw is turned.

The input lever 34 consists of a flat plate, forked at one end by reason of extended arms 47. These arms straddle the actuator nut 37 and prevent its rotation. Two balls 32 are located and fastened at the opposite end of the input lever either by soldering or welding. These balls are set in the annular groove 31 and determine a horizontal axis A—A about which the input lever 34 turns. A hole 48 is cut through the input lever so as to permit passage and movement of the link assembly.

The output lever 35 is composed of a flat horizontal plate 49, two supporting arms 50 and a bearing means 51. The supporting arms are connected on either side of the horizontal plate and extend down so as to straddle the input lever 34. Pivot balls 33 are welded or soldered to the ends of the arms and are located in ring groove 31 and define an axis of rotation B—B which is parallel to the aforesaid axis A—A but on the opposite side of the link assembly from it. The horizontal plate 49 contains a bore 52 and a concave countersink 53, which forms the socket portion of a ball and socket connection to the link assembly. A tubular member 54 of the link assembly has a convex flanged portion 55 near its end, which in turn forms the ball portion of the joint. Thus, when the output lever 35 pivots about its axis of rotation, the link assembly is pulled upward without binding; yet the tubular member 54 is free to rotate. The bearing means 51 is a hardened, rounded piece such as a ball and is soldered or welded to the underside of the horizontal plate 49. The bearing rests on the upper side of the input lever 34 and is free to slide along its length.

The link assembly consists of a tubular connecting member 54 and a column 56 threaded into this member. The upper end of the connecting member 54 contains a slot 57 for insertion of a tool such as a screwdriver, for easy adjustment. By turning the tubular member, the effective length of the link assembly may be varied. The column is connected to the spacer member 19 of the anode assembly.

A resilient restraining member 59 is composed basically of a flexible circular portion to which are integrally connected four legs which straddle the actuator assembly and support the circular portion above it. Bolts 61 running through holes drilled in each of these legs serve to securely attach the member to plate 29. An adjusting screw 62, threaded into the center of the flexible plate, may be turned so that it bears down with more or less force upon the column 56 via spacer bar 63. This controls the amount of spring restraint imposed upon the movement of the link assembly. The adjustment may conveniently be made by means of a tool such as a screwdriver in the same manner as the adjustment for the length of the link assembly is made. A tubular cover 58 fits over the actuator and restraining mechanisms and serves to protect them from heat and dust. The cover is attached to the restraining member 59 by means of screws 60. A hole in the cover permits access to the adjusting screw.

During operation of the tube, cavity grid spacing is maintained by a balance of forces on the link assembly. A downward force is supplied by the combined effects of a spring 64 and the resilient piece 59. This is opposed by the upward reaction of the output lever arm 35 upon the under side of the rounded flange portion 55 of the link assembly. By means of this arrangement it is possible to build the actuator assembly very rugged thus ensuring accuracy and repeatability.

Operation of the actuator assembly is initiated by turning the tuning knob 36 which causes the actuator nut 37 to ride up and rotate the input lever arm 34 in a counter-clockwise direction. The upper side 65 of the input lever moves upward against the bearing means 51 of the output lever 35 causing it to rotate in a clockwise direction about its pivot 33. Because of the sliding action between the input lever surface 65 and the output lever bearing means 51, a varying mechanical advantage is experienced which results in a non-linear rotation of the output lever with respect to the input lever. This movement is transmitted to the link assembly via the ball and socket joint and causes the link assembly to move different amounts, depending upon where in the course of rotation the input lever happens to be. The distances between the lever arms and their fulcrums as well as the location of the slidable bearing surfaces are chosen so that the non-linearity of link assembly movement will be such as to compensate for the non-linearity in frequency of the cavity output as the grids are moved equal distances to or from each other.

Spring tension on the link assembly may be increased by turning down the adjusting screw 62. This causes the screw to exert pressure through a spacer bar 63 to the column 56. As the adjusting screw 62 is turned down, the resilient piece 59 will experience an upward strain and consequent greater internal stress causing it to react with greater force against the link assembly. By further turning the adjusting screw, this force may be increased to a point where the tuning assembly becomes substantially locked, thus insuring against the adverse effects of shock and vibration; or it may be adjusted to a point where the link assembly is firmly held while still permitting a low torque servo motor to turn the tuning screw. This is enhanced by the rather high mechanical advantage (about 40:1) of the actuator assembly.

In either event, because of the arrangement and construction of the lever arms, the positioning of the link assembly is made solely a function of the lever arm location and is independent of the amount of spring tension exerted. In this manner both accuracy and repeatability are attained.

The adjusting screw 62 may be removed so as to permit access to the outer tubular connecting member 54. By turning this piece, the overall length of the link assembly may be adjusted. This permits an initial setting of the actuator assembly so that its non-linearity will be properly aligned with the non-linear characteristics of the cavity.

An auxiliary spring 64 is located between the circular plate 29 and flange 65 which is attached to the column 56 of the link assembly. This spring produces a downward force of the link assembly against the output lever arm, and maintains a degree of restraint so as to permit operation of the tube while the adjusting screw is removed. In this manner the length of the link assembly may be adjusted during operation of the tube without the effect of mechanical backlash.

Figure 4:
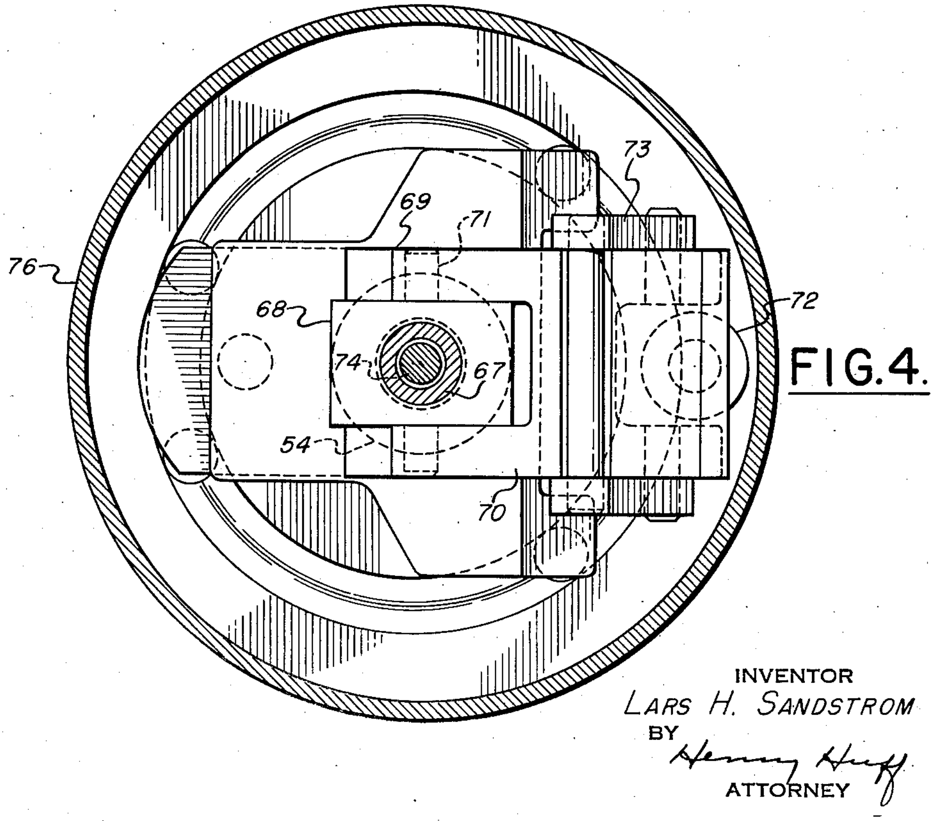
Fig. 4 is a section view of the modified version of the device taken at 4—4 of Fig. 3.
Figure 3:
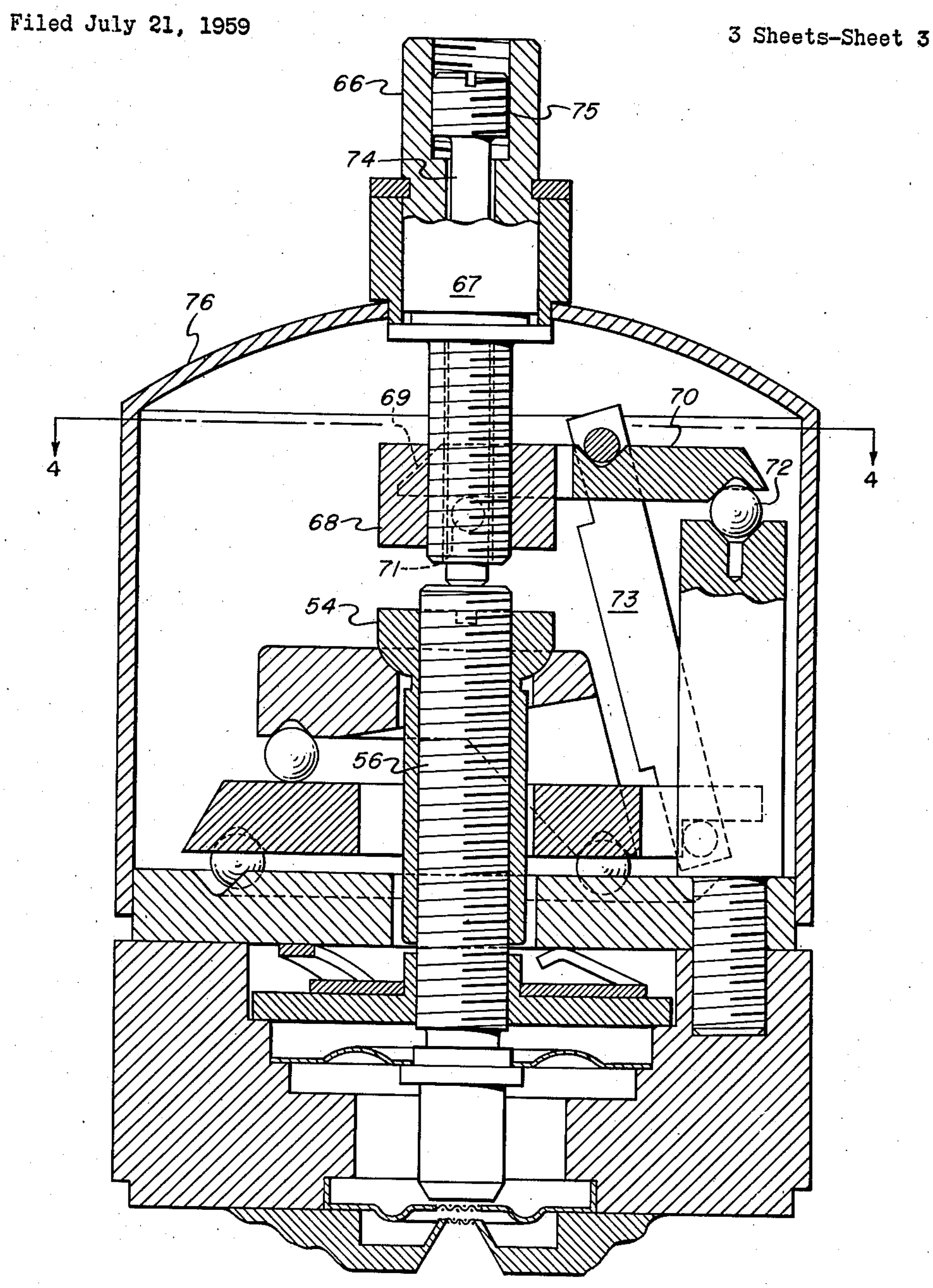
Fig. 3 is a cross section view showing a modified version of the tuning screw assembly.

For certain applications it becomes desirable to have the tuning knob coincident with the tube axis. A specific embodiment of the invention which produces this result is shown in Figs. 3 and 4. Tuning is accomplished by turning the tuning knob 66 of tuning screw 67. This will produce an upward movement of the adjusting nut 68, which is prevented from rotation by reason of the extension of arms 69 projecting from beam 70. These arms extend from the beam on either side of the adjusting nut and rest on pins 71. As the nut rises, the pins will lift up on the beam 70, causing it to rotate in a clockwise manner about a ball pivot 72. A rod 73 is pulled upward by the beam as it rotates. This rod in turn causes a counter-clockwise rotation of the input lever arm 34.

A setscrew 74 extends completely through the tuning screw and is threaded into it at a point 75. By turning the setscrew with respect to the tuning screw, the setscrew may be brought to bear upon the column 56 in the same manner as the adjusting screw 62 in the previous embodiment. Thus the amount of spring restraint exerted by cover 76 can be varied. Also the setscrew may be withdrawn so as to permit application of a tool to turn outer tubular connecting member 54 for purposes of adjusting the link assembly length. Because the set-screw 74 turns with the tuning screw, there is no relative rotation between them during tuning of the tube. Consequently, the ratio of spring restraint to cavity gap width remains substantially constant throughout the tuning range.

It is to be understood that the invention has been described in what are considered its most preferred embodiments and that there are many other possible ramifications and arrangements which could be made without departing from the same general aspects. For this reason the preceding discussion is to be regarded as descriptive in nature and not as a limitation.

What is claimed is:

1. A rugged tuning mechanism for a high frequency electron beam device, said mechanism comprising a resonant cavity having two closely spaced electron permeable grids disposed in alignment along an electron beam axis, said cavity being tunable by the axial movement of one of said grids with respect to said cavity, a tubular housing along said axis and supporting and enclosing said electron beam device and said cavity, one end of said housing crossing said axis and covering said device, a rigid column along said axis connecting said moveable grid to a point on said end of said housing, said housing including a resilient means and an adjustable length rigid means, each of said means extending around said axis between said cavity and said point on said housing, both said means being extensible in a direction parallel to said axis, and forming integral portions of said housing for supporting said column at said point in a predetermined space relationship with said cavity, and actuating means for moving said column along said axis against said housing, said actuating means connected to said column between said point and said moveable grid, and connected to said housing between said cavity and said integral portions.

2. The tuning mechanism described in claim 1 wherein said adjustable length rigid means comprises a screw threaded through said end of said housing along said axis.

3. The mechanism as defined in claim 1 wherein said resilient means is a deflectable plate substantially transverse to said axis, said plate forming said end of said housing.

4. The mechanism as defined in claim 1 wherein said actuating means includes a lever disposed substantially transverse to said axis within said housing, a fulcrum between said lever and said cavity, said fulcrum fixed with respect to said cavity, means connecting said lever to said column, and means for rotating said lever about said fulcrum.

5. A tuning mechanism for a reflex klystron, said mechanism including a microwave resonant cavity having closely spaced electron permeable grids aligned in an electron beam along a predetermined axis, one of said grids being movable with respect to said cavity along said axis to cause tuning of said cavity, a column along said axis connected at one end to said movable grid, actuating means for moving said column along said axis, away from said cavity, said actuating means including first and second levers extending across said axis from fulcrums on either side of said axis, bearing means supported between and contacting adjacent sides of said levers near said first lever fulcrum, said first lever being closer to said cavity than said second lever in the vicinity of said bearing means, connecting means between an intermediate point on said second lever and a point on said column, and means for rotating said first lever about said first lever fulcrum, said actuating means adapted to produce grid displacements resulting in equal incremental frequency changes for equal incremental amounts of rotation of said first lever, and a housing enclosing and supporting said cavity, said fulcrums and said column opposite end in predetermined space relationships, said housing assembly including a resilient portion and an adjustable length rigid portion, each of said portions extending around said axis between said fulcrums and the opposite end of said column, and both said portions being extensible in a direction parallel to said axis.

6. The tuning mechanism defined in claim 5 wherein said resilient portion of said housing assembly comprises a deflectable plate mounted transverse to said axis.

7. The tuning mechanism defined in claim 5 wherein said adjustable length rigid portion of said housing assembly comprises a screw threaded through said housing along said axis.

8. The tuning mechanism as defined in claim 5 wherein said connecting means comprises a tubular member in threaded engagement with said column and pivotally mounted at said intermediate point, whereby rotation of said tubular member will effect a change in axial distance between said intermediate point and said point on said column, and a further resilient means connecting a point on said housing and a point on said column between said connecting means and said cavity.

9. The tuning mechanism defined in claim 5, wherein said rotating means includes a first member constrained to translatory motion, a second member constrained to rotary motion, one of said members being internally threaded along an axis, the other of said members being externally threaded along the said axis and threaded into said internally threaded member, and a connecting means between said first lever and said first member, said connecting means permitting freedom of relative motion between said first lever and said first member in a line along the axis of said first lever and preventing relative motion along the axis of said first member.

References Cited in the file of this patent

UNITED STATES PATENTS

| | | |
|---|---|---|
| 2,414,785 | Harrison et al. | Jan. 21, 1947 |
| 2,466,058 | Sorg | Apr. 5, 1949 |
| 2,506,955 | Fracassi | May 9, 1950 |
| 2,529,950 | Kather | Nov. 14, 1950 |
| 2,777,968 | Kenyon | Jan. 15, 1957 |